R. B. AIMAN.
GO-CART.
APPLICATION FILED APR. 15, 1914.
1,129,054.
Patented Feb. 23, 1915.
2 SHEETS—SHEET 2.
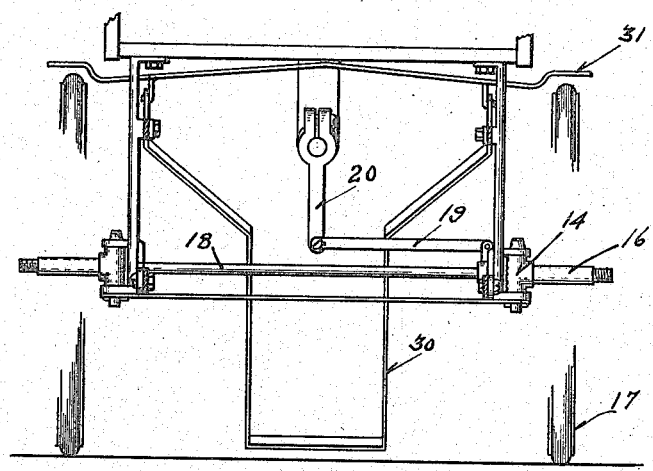
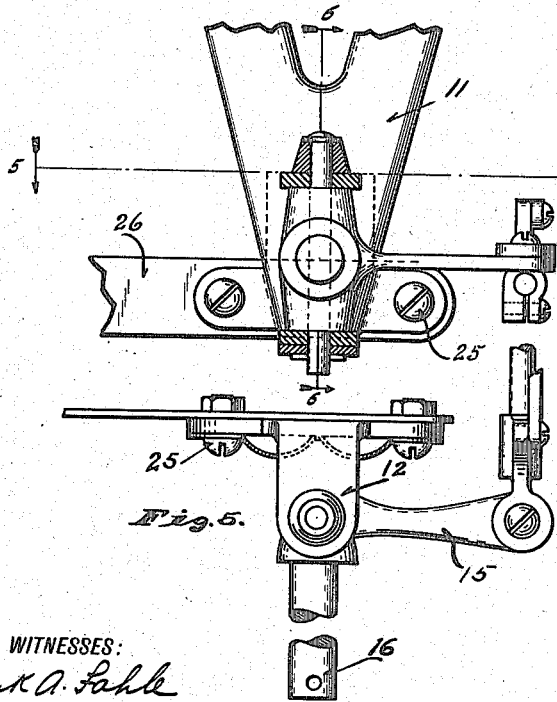
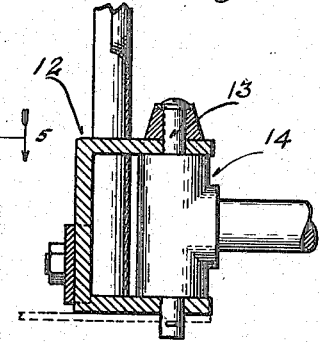
WITNESSES:
Frank A. Fahle
Yost Biaddock
INVENTOR
Roland B. Aiman,
BY
Arthur M. Hood
ATTORNEY

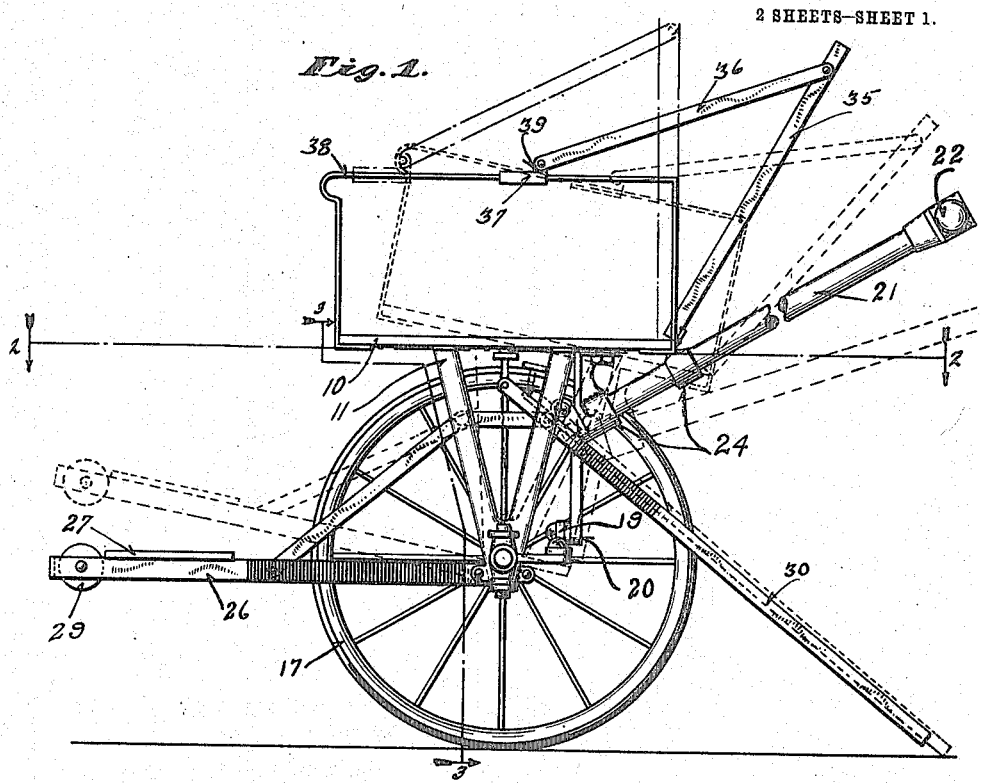
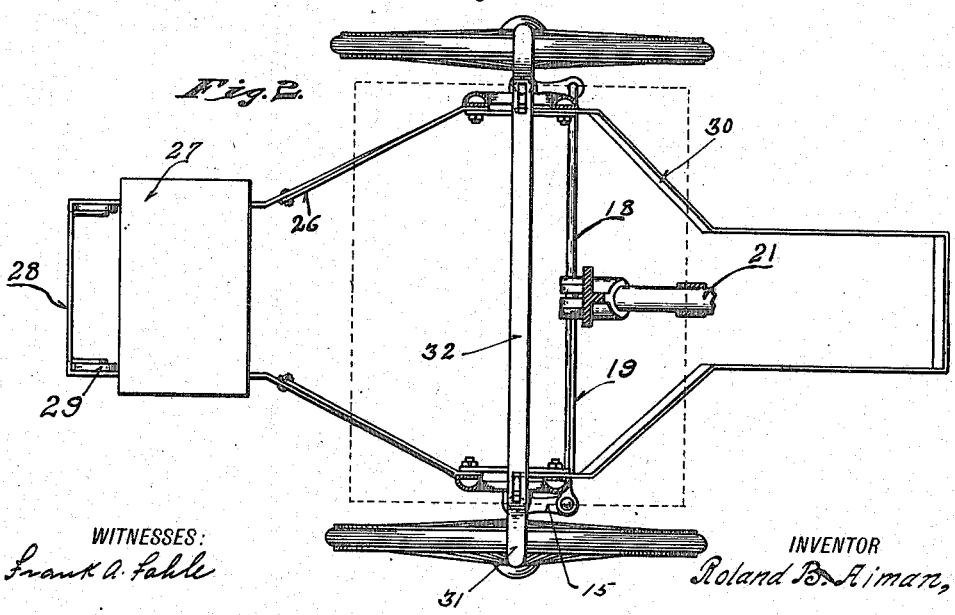

UNITED STATES PATENT OFFICE.

ROLAND B. AIMAN, OF PENDLETON, INDIANA.

GO-CART.

1,129,054.      Specification of Letters Patent.      Patented Feb. 23, 1915.

Application filed April 15, 1914. Serial No. 831,897.

*To all whom it may concern:*

Be it known that I, ROLAND B. AIMAN, a citizen of the United States, residing at Pendleton, in the county of Madison and State of Indiana, have invented a new and useful Go-Cart, of which the following is a specification.

My invention relates to gocarts, for infants, and has for its object the facilitating of the pushing of the gocart through a crowd by making the two supporting wheels for the gocart skewable about a substantially vertical axis, conveniently by the turning of the pushing handle by which the gocart is operated; and also to provide a supporting member which holds the gocart substantially upright without attention and at the same time brakes the wheels.

My invention is illustrated in the accompanying drawings.

Figure 1 is a side elevation of a gocart embodying my invention; Fig. 2 is a section on the line 2—2 of Fig. 1; Fig. 3 is a section on the line 3—3 of Fig. 1; Fig. 4 is a detail view showing the construction of the pivotal support for one of the wheels; Fig. 5 is a section on the line 5—5 of Fig. 4; and Fig. 6 is a section on the line 6—6 of Fig. 4.

The seat 10 of the gocart has fastened to its under surface at each side a V-shaped supporting bracket 11, which conveniently consists of a metal stamping, each stamping at the bottom being notched to receive a small U-shaped metal stamping 12 of which the legs of the U project outward through the stamping 11 substantially horizontally to form bearings for a pivot pin 13, on which is mounted between the legs of the U-shaped stamping 12 a knuckle 14 having a rearwardly extending arm 15 and a sidewise extending stub shaft 16, one of the supporting wheels 17 of the gocart being mounted on each of these stub shafts. The arms 15 of the two knuckles are connected to each other by a rod 18, and the arm 15 of one of the knuckles is connected by a link 19 to a downwardly extending arm 20 from the forward end of the pushing handle 21, said pushing handle being provided at its rear end with a cross arm or grip 22 and being rotatably mounted in any suitable manner, as within supporting brackets 24 attached to the seat 10. By turning the grip 22 and the rod 21 about the axis of the latter, the knuckles and wheels are turned about the pivot pins 13, to permit the gocart to be pushed diagonally toward either side as desired without turning the gocart in its entirety.

The U-shaped members 12 are fastened to the brackets 11 by means of bolts 25, which also fasten to said brackets a pair of forwardly and inwardly extending arms 26 which near their forward end carry the foot board 27, the two arms 26 preferably being interconnected at their forward end by a cross piece 28, and carrying small wheels 29 which are of service in lifting the gocart up curbs.

Pivoted to the rear legs of the U-shaped brackets 11 are the two legs of a supporting member 30, the rear end or foot of which projects rearwardly and downwardly into proximity to the ground, the forward ends of said legs being provided with outturned fingers 31 which overlie fairly closely the tires of the wheels 17. The two fingers may be connected by a cross bar 32. When the pusher releases the grip 22 and allows the rear end of the supporting member 30 to rest on the ground, which it will do because the center of gravity of the whole device, either with or without an occupant, is slightly to the rear of the points where the wheels engage the ground, the cart tilts backward slightly and thereby causes the fingers 31 to be moved downward into engagement with the wheel tires, thus effectively braking the wheels and preventing accidental movements of the gocart while it is without attention.

To the rear edge of the seat 10 is pivoted a back 35, from near the upper end of each side of which a pivoted arm extends forward to a slide 37 slidably mounted on a side arm 38 supported from the seat 10 at each side of the cart. The arm 36 is pivotally attached to an upwardly extending ear 39 on the slide 37, which slide folds around the side arm 38 so that it is clamped thereon by tension on the arms 36, the ear 39 being located sufficiently near a rear corner of the slide 37 to produce this result.

I claim as my invention:

1. A gocart comprising a seat, a single pair of supporting wheels wholly supporting said seat, each of said wheels being pivotally mounted for skewing about an axis transverse to the seat, and means for controlling the skewing of said wheels.

2. A gocart comprising a seat, a single pair of supporting wheels wholly supporting said seat, each of said wheels being pivotally mounted for skewing about an axis transverse to the seat, a push handle for the gocart, said handle being movable relatively to the seat, and means whereby such movement controls the skewing of said wheels.

3. A gocart comprising a seat, a single pair of supporting wheels wholly supporting said seat, each of said wheels being pivotally mounted for skewing about an axis transverse to the seat, a push handle for the gocart, said handle extending backwardly from said seat and being rotatable about its axis, and connections between said handle and said wheels whereby rotation of the handle controls the skewing of the wheels.

4. A gocart, comprising a seat, a pair of brackets made of metal stampings and attached to the under side of said seat, said brackets being provided with perforations, and a U-shaped member extending through said perforations of each bracket and also made of metal stampings, each of said U-shaped members having one of its legs substantially above the other, a wheel-supporting knuckle pivoted in the legs of the U of each supporting member, and wheels journaled on said knuckles.

5. A gocart, comprising a seat, a pair of brackets attached to the under side of said seat, said brackets being provided with perforations, and a U-shaped member extending through said perforations of each bracket, each of said U-shaped members having one of its legs substantially above the other, a wheel-supporting knuckle pivoted in the legs of the U of each supporting member, and wheels journaled on said knuckles.

6. In a gocart, the combination of a seat, a pair of wheels supporting said seat, an operating member for said gocart, and a supporting member pivotally connected with the gocart and having one end which engages the ground when said operating member is released and another end which engages a wheel to brake the same when said first end engages the ground and swings the supporting member around its pivot.

7. In a gocart, the combination of a seat, a pair of wheels supporting said seat, an operating member for said gocart, and a supporting member having a pivotal connection with the other parts of said gocart and having a foot for engaging the ground when the operating member is released and fingers which are forced into contact with the peripheries of the wheels to brake the same when said foot engages the ground.

8. A gocart comprising a seat, a plurality of supporting wheels therefor, all said wheels being pivotally mounted for skewing relatively to the seat about separate axes thansverse to the seat, said wheels being interconnected so that when skewed they turn through substantially the same angle, and means for controlling the skewing of said wheels.

9. A gocart comprising a seat, a plurality of supporting wheels therefor, all of said wheels being pivotally mounted for skewing relatively to the seat about separate axes transverse to the seat, and means for controlling the skewing of said wheels.

10. A gocart comprising a seat, a plurality of supporting wheels therefor, all of said wheels being pivotally mounted for skewing relatively to the seat about axes transverse to the seat, and means for controlling the skewing of said wheels.

In witness whereof, I have hereunto set my hand at Indianapolis, Indiana, this ninth day of April, A. D. one thousand nine hundred and fourteen.

ROLAND B. AIMAN.

Witnesses:
JOSEPHINE GASPER,
G. B. SCHLEY.